Patented Feb. 3, 1942

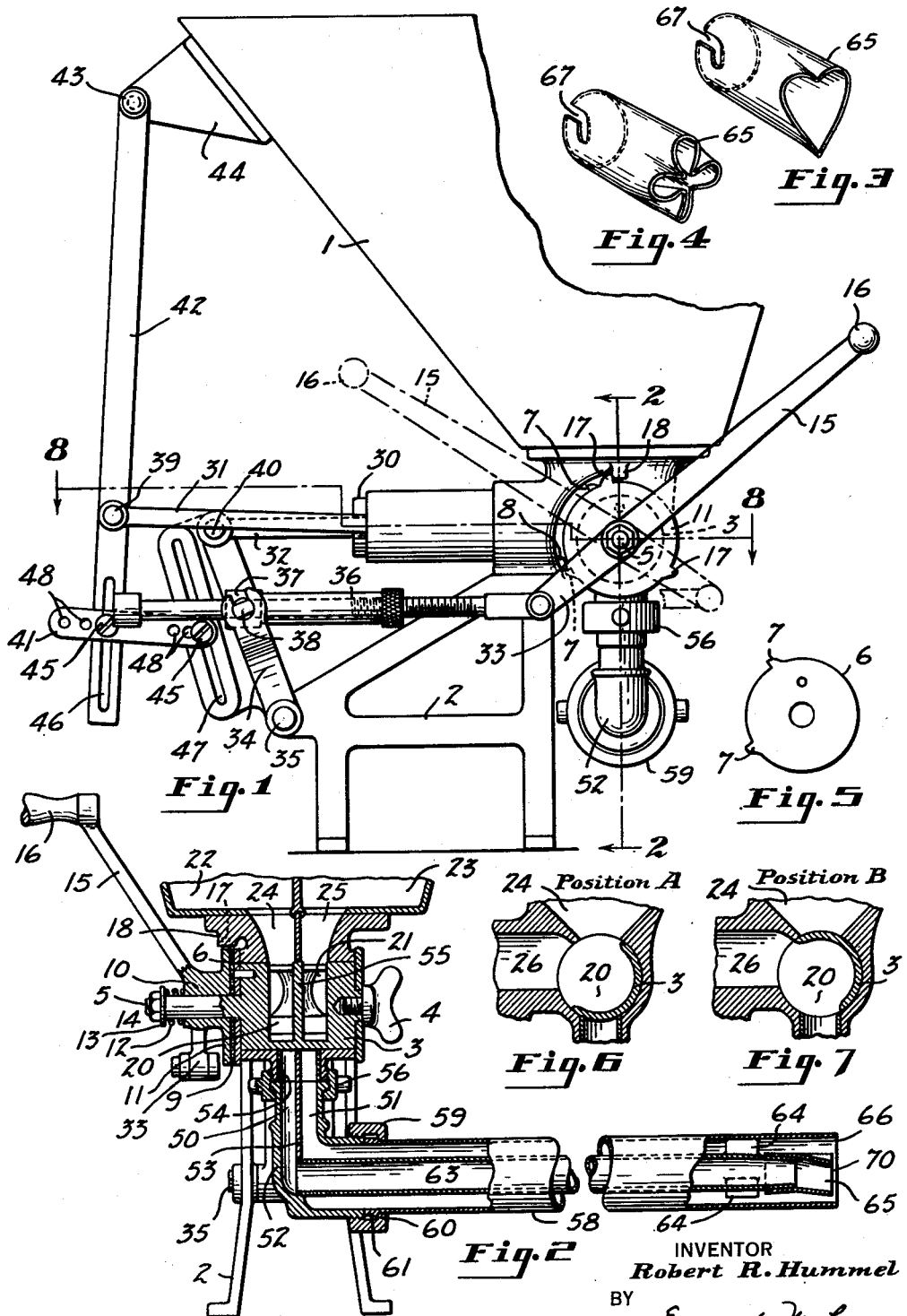

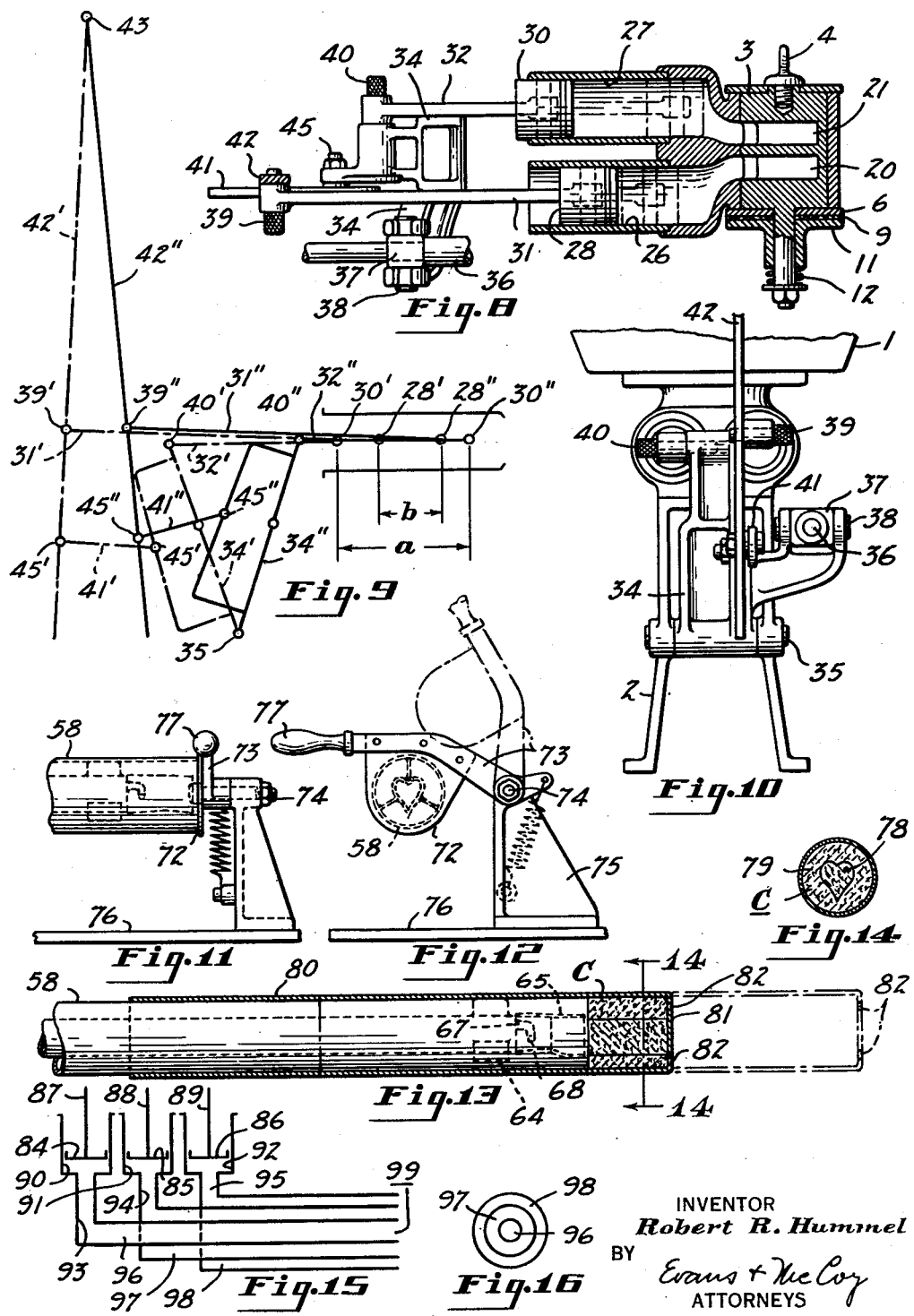

2,271,767

UNITED STATES PATENT OFFICE 2,271,767

APPARATUS FOR FORMING CONFECTIONS

Robert R. Hummel, East Cleveland, Ohio

Application March 4, 1938, Serial No. 193,963

1 Claim. (Cl. 107—1)

This invention relates to apparatus for forming confections in a plastic or semisolid condition such as, for example, ice cream and the like.

It is an object of the invention to provide a machine for forming bars of composite confection having distinctive designs incorporated therein, which machine is simple and efficient.

A further object of the present invention is to provide a machine for dispensing confections which will unite a plurality of individual streams of different kinds of confection to form a composite confection having distinctive designs incorporated therein.

Another object is to provide a machine of the type mentioned which has interchangeable parts so that the distinctive designs of the confections may be varied at will.

Other objects and advantages of the present invention will become apparent from the following detailed description accompanied by the several drawings, in which:

Figure 1 is an elevational view of a machine illustrating an embodiment of the invention;

Fig. 2 is a vertical sectional view taken substantially on the line 2—2 of Fig. 1;

Figs. 3 and 4 are perspective views of fittings employed to shape individual streams of plastic confection;

Fig. 5 is a detail view of the rotatable valve end or stop disc;

Figs. 6 and 7 are detail sectional views, with parts removed, showing the valve positions at different moments of operation;

Fig. 8 is a horizontal sectional view taken substantially on the line 8—8 of Fig. 1;

Fig. 9 is a diagrammatic view showing the relation of the parts regulating the feed rates for the pump or feed mechanism;

Fig. 10 is an elevational view showing the mechanism for operating the feed pistons;

Fig. 11 is an elevational view of a cutoff mechanism;

Fig. 12 is an elevational view of the cutoff mechanism shown in Fig. 11 looking toward the end of the extruding tube;

Fig. 13 is an elevational view, partially in section, showing the confection forming mechanism or extruding tube;

Fig. 14 is a sectional view taken substantially on the line 14—14 of Fig. 13 and showing a composite confection formed in accordance with the invention; and Figs. 15 and 16 are diagrammatic sectional views of a modified form of the dispensing or feeding mechanism and forming or extruding tubes.

Methods now used for making composite confections having distinctive designs incorporated therein, such as ice cream having a center portion outlined or shaped in one of many designs and of a different kind or color of ice cream than the surrounding ice cream are rather inefficient and expensive, requiring a great deal of handling of the materials. For example, one method is to mold the center portion from one kind of ice cream while in a plastic condition and solidify it by freezing. The center is then removed from the mold and immersed in a container of plastic ice cream of the kind desired for the outside, locating the center by hand. The composite ice cream is solidified and after the mold has been removed the product is a bar of composite ice cream which is cut or divided as desired.

According to the method of my invention such a bar of composite ice cream may be obtained directly. Referring to the accompanying drawings, in which like parts are designated by the same numerals throughout the several views, it may be seen that a machine illustrating the present invention comprises, briefly, a receptacle or hopper 1 divided into a plurality of sections for the various kinds of plastic confections or substances, a feed mechanism, a dispensing or extruding mechanism, and a receiver or holder to retain the several portions of the composite confection in their correct relative positions until solidified.

The hopper 1 is supported by frame 2 which may be provided with a recess to receive a rotatable valve member 3. The member 3 may be held in place by a suitable bolt 4 and is provided with a stub shaft 5 in axial alinement and at one end thereof. Mounted on the stub shaft in the order named are a disc 6 keyed to the member 3 and provided with lugs 7 arranged to cooperate with a stop 8 on the frame and limit the rotational movement of the valve 3, as will later appear; a leather friction washer 9; a collar or hub 10 provided with a circumferential flange 11 at its inner end which abuts the friction washer 9 and rotates the washer and valve 3 by frictional engagement maintained by spring 12 held by washer 13 and nut 14. The collar 10 is provided with a radially directed crank or arm 15 having a suitable handle 16 for reciprocating the collar within limits imposed by lugs 17 formed on the flange 11 and a stop 18 mounted on the frame.

In the middle portion of the valve member 3 are pockets 20 and 21 positioned to communicate with bulk compartments 22 and 23 of the hopper 1 through passages 24 and 25, respectively, formed in the frame. When the pockets 20 and 21 are in position A, Fig. 6, so as to be in communication with the compartments of the hopper they are also in communication with cylinders 26 and 27 of a reciprocating feed pump of any suitable type having pistons 28 and 30 and connecting rods 31 and 32 pivotally connected thereto.

The connecting rods 31 and 32 are actuated by an extension 33 on hub or collar 10 which oscillates a member 34 pivoted at 35 on the frame 2 by means of an adjustable link 36. The reciprocable movement of the lever arm 15 is imparted to the member 34 through a cross head 37 carried by trunnions 38 in sockets formed in a bifurcated end of an extension formed on member 34. The cross head 37 slides between stops on the adjustable link 36 to effect a period of lost motion of the lever 15 with respect to the member 34. Adjustment of the link 36 varies the distance between the cross head stops so as to regulate the amount of lost motion.

Pivot pin 40 secures the connecting rod 32 to the oscillatable lever 34. Movement of the member 34 is transmitted to the connecting rod 31 of the piston 28 by an adjustable link 41 and a lever 42 pivoted at 43 to a bracket 44 carried by an upper portion of the hopper 1. The rod 31 is pivoted at 39 to the lever 42. The link 41 is carried by pivot studs 45 adjustably secured in elongated slots 46 and 47 formed in the lever 42 and the member 34, respectively. Adjustment of the link 41 for length is effected by a plurality of holes 48 for the pivot pins 45. Movement of the pins 45 to various positions in the slots 46 and 47 regulates the amplitude of oscillation of the lever 42 with respect to the member 34. In this manner the length of stroke of the piston 28, actuated by the lever 42, may be varied with respect to the length of stroke of the piston 30 actuated directly by the member 34. Since the lever 42 is connected by the link 41 to the member 34 the oscillation or movement of the piston 28 is in synchronous timed relation with respect to the movement of the piston 30 so that for each portion or increment of material fed by the piston 28 a definite predetermined quantity of material or substance is fed by the piston 30.

When the valve member 3 is rotated to position B (Fig. 7) the passages 20 and 21 communicate with the cylinders 26 and 27 respectively and also with passages 50 and 51 formed in the vertically disposed leg of tubular elbow fitting 52 by means of a divider or partition 53. The elbow 52 has a pilot sleeve 54 received in a cylindrical discharge opening formed in a boss portion of the frame and in communication with the cylindrical bore which receives the valve member 3. The partition 53 abuts against the peripheral edge of dividing wall 55 between pockets 20 and 21 in the valve member 3. Thus the pocket 20 in the valve member communicates solely with the cylinder 26 and passage 50 when the valve member is in position B; similarly pocket 21 communicates solely with cylinder 27 and passage 51 when the valve member is in this position. The elbow fitting 52 is secured to the frame boss by means of an annular threaded collar 56, of well known construction, which is screwed onto the boss.

Secured to the horizontally disposed portion of the elbow fitting 52 is a discharge or forming tube 58. The passageway through this tube extends as a continuation of the elbow and the tube is secured by a threaded collar 59 which screws onto the end of the elbow fitting and has an inwardly directed annular flange 60 which engages with a circumferential shoulder 61 formed on the end of the tube 58.

Extending longitudinally through the outer forming tube 58 is an inner forming or discharge tube 63 which conducts the core or center of the ice cream bar. The tube 63 is secured in the partition 53 and communicates with the passage 50. Thus ice cream forced out of the cylinder 26 by the piston 28 moves through the pocket 20 in the valve member 3 and into the passage 50 thence into the core or inner discharge tube 63. Ice cream forced out of the cylinder 27 by the piston 30 moves into the pocket 21 of the valve member, through the passageway 51, thence into the outer forming tube 58, the ice cream in the latter tube surrounding the inner or core tube 63, the ice cream in the outer forming tube moving in the same direction as the ice cream in the inner forming tube.

The core or inner tube 63 is alined or centered in the passageway through the outer forming tube 58 by legs 64 secured to the inner tube and extending radially therefrom to abut against the inner surface of the outer forming tube 58.

An extruding die or nozzle 65 is received telescopically on the end of the inner forming tube 63 and is supported thereby within the open end or orifice of the outer forming tube 58. Preferably the nozzle 65 is provided with a bayonet slot 67 which receives a pin 68 secured to the inner tube 63, thus preventing inadvertent longitudinal movement of the nozzle with respect to the tube while permitting ready removal and replacement of the nozzle by an operator.

Figs. 3 and 4 illustrate extruding dies or nozzles which may be interchangeably used on the inner forming tube 63 in making ice cream cakes having ornamental centers. The die illustrated in Fig. 3 is for producing heart shaped centers, and the die illustrated in Fig. 4 is to produce a cloverleaf or trefoil center. Other dies formed to extrude material having any of a number of well known cross-sections may be provided to be interchangeably used on the inner forming tube 63.

The dies or nozzles 65 are arranged so that extruding orifices 70 of each are disposed substantially in the plane of the orifice 66 of outer forming tube 58. Accordingly, ice cream issues from the orifice 70 substantially at the same instant that ice cream issues from the mouth 66 so that both portions of ice cream move together through and beyond the discharge outlet or compound orifice of the apparatus.

A cut-off or stop 72 preferably in the form of a relatively thin plate is carried by an arm 73 pivoted at 74 on a bracket 75 secured to a table 76 which extends beneath the tube 58 and may also serve as a support for the frame 2 of the machine. The arm 73 has a handle 77 so that the operator may raise and lower the cut-off plate 72 as desired and a spring (not shown) is provided to normally urge the plate to a position across the orifice 66 of the extruding or forming tube 58. In its normal position, illustrated by the full lines of Fig. 12, the cut-off plate 72 is disposed against the end edge of the outer tube 58 and has circumferential contact therewith so as to substantially prevent the egress of ice cream from the common or compound orifice. When elevated to the broken line position of Fig. 12 the plate 72 is removed from the orifices 66 and 70 so that a free flow of ice cream through the extruding unit is permitted.

A multiplicity of tubular holders 80 are provided to receive the ice cream extruded from the tubes 58 and 63. These holders are in the form of sleevelike cans which have telescopic sliding engagement with the outer forming tube 58. One end of each of the tubes or holders 80 is formed with a bottom or closure 81 provided with holes 82 for the passage of air when removing the ice cream or other confection from the holders and when sliding the holders on the tube 58.

The cross-sectional shape of the forming tube 58 determines the surface contour of ice cream or other confection. In the present instance the forming tube 58 and the receiver or holder 80, slidable thereon, are of circular cross-section, but they may be any suitable shape, such as square or hexagonal.

The length of the outer forming tube 58 from the mouth 66 thereof to the flange 60 of the collar 59 is equal to or longer than the length of the holder 80 so that when the holder is received by the forming tube the latter is substantially enclosed. However, the forming tube 58 with its associated parts and constituting the extruding unit may be used with materially shorter holders 80 if desired. Each of the holders 80 is preferably of a length which is conveniently handled by an operator, since the holders are individually manipulated during the manufacture of the confection as will later appear.

The considerable length of the forming or discharge tubes 58 and 63 is of material benefit in promoting a smooth and uniform flow of all the confection streams over the several courses and reducing distortion of the core design. Any unevenness or turbulence in flow at the inlet end of the discharge unit diminishes as the streams approach the common orifice and all portions of each stream tend to advance with greater uniformity and regularity. This smoothing out of the flow maintains a greater similarity in appearance of successive bars of composite confection since the cores or centers are of increased uniformity.

In manufacturing distinctive design confections such as ice cream in the form of cakes having ornamental centers, or ice cream cakes having predetermined portions thereof formed of different kinds of ice cream, the apparatus described above may be utilized as follows:

Ice cream or other confection previously prepared in accordance with well known practice and in a plastic flowable form is placed in the hopper bulk compartments 22 and 23. That intended for the center or figured portion 78 of the ice cream cake is placed in compartment 22 and that for the outer portion 79 of the cake surrounding the center 78 is placed in the compartment 23. The desired nozzle or die 65 is secured on the end of the inner forming tube 63 as described above. The ratio of the effective extruding area of the orifice 70 of the nozzle 65 to the effective extruding area of the orifice 66 of the outer forming tube 58 previously determined is then utilized to set the pumping apparatus to force the two kinds of ice cream out the several orifices simultaneously and at substantially the same linear speed. Since the movement of the piston 30 with respect to the movement of the oscillatable lever 34 is constant, the adjustment for determining the quantity of ice cream pumped by the piston 30 in the cylinder 27 with respect to the quantity pumped by the piston 28 in the cylinder 26 is effected by altering the position of the adjustable link 41. To increase the relative amount of confection pumped by the piston 28 the studs 45 for the link 41 are moved upward as viewed in Fig. 1; to decrease the relative quantity of confection pumped by the piston 28 the studs 45 are moved downward.

Fig. 9 is a diagrammatic view showing the relationship between the several parts of the pump actuating mechanism and the movements of the pump pistons. With the arm 15 to the left or broken line position of Fig. 1, the pistons 28 and 30 are in the positions 28' and 30', respectively. Movement of the arm toward the right or full line position of Fig. 1 advances the pistons to the positions 28'' and 30'', respectively, the piston 28 moving the distance $b$ and the piston 30 moving the distance $a$. The other parts have likewise been indicated with single prime numerals to show the retracted or start position and double prime numerals to indicate the advanced or finished position after a work stroke to feed the confections through the discharge unit.

A holder 80 is placed on the discharge tube 58 by raising the arm 73 of the cut-off plate and sliding the holder over the tube 58 until the bottom 81 substantially abuts the end of the tube. The cut-off plate 72 when released rests on the outer surface of the holder 80 and has sliding engagement therewith when the holder moves over the discharge tube.

Movement of the arm 15 back and forth actuates the pistons 28 and 30 to force the plastic confection or ice cream from the hoppers 22 and 23 through the apparatus and out a common discharge opening or extruding orifice formed by the orifices 66 and 70 of the discharge tube and nozzle respectively.

During the movement of the arm 15 to the left as viewed in Fig. 1, from the full line position to the broken line position, there is a period of lost motion of the adjustable link 36 with respect to the cross-head 37 during which no movement of the pistons 27 and 30 is effected. Frictional engagement of the inner disk 6 and flange 11 with the leather washer 9 effects rotation of the valve member 3 from position A to position B during the lost motion movement of the link 36. One of the lugs 7 on the disk 6 engages the stop 8 to retain the valve member 3 in position B during the continued movement of the arm 15 to the left and while the pistons 28 and 30 force the plastic ice cream out of the cylinders 26 and 27, through the pockets 20 and 21 in the valve member and into the passageways of the discharge tube unit.

At the commencement of movement of the arm 15 from the left to the right as viewed in Fig. 1, there is an initial period of lost motion during which the adjustable link 36 slides in the cross head 37 and the valve body 3 is rotated from position B to position A by the frictional engagement of the inner disk 6 and the flange 11 with the friction washer 9. After the lost motion travel of the adjustable link 36 and while the pistons 28 and 30 are drawing a fresh charge of confection from the compartments 22 and 23 respectively of the hopper 1, the valve body 3 is restrained against continued rotational movement by the stop 8 which engages the other of the lugs 7.

After the drawing of a fresh charge of confection into the cylinder, the arm 15 is actuated in the opposite direction and the cycle repeated to empty the cylinders and force the different confections or kinds of ice cream 78 and 79 in separate courses and at rates which cause the several confections to issue at substantially the same linear speed and in the form of a composite or mosaic bar C from the discharge end of the forming tube. The ice cream or confection 78 which issues from the orifice 70 of the nozzle 65 is completely surrounded by the ice cream or other confection 79 which issues from the orifice 66 of the discharge tube 58. The composite confection C having a distinctive cross-sectional design and in the form of a partially frozen or plastic bar is received by the holder 80 which slides over the discharge tube 58 to the right as viewed in Fig. 13 and in synchronous timed relation with respect to the speed of the united streams of composite confection C under the influence of the pumping means or pistons 28 and 30. The telescopic sliding movement of the holder 80 with respect to the discharge unit tube is indicated by the full line and broken line positions of Fig. 13.

As soon as sufficient confection has been forced into the holder 80 to move the latter to or beyond the end of the discharge unit, the cut-off or stop plate 72 is released to move across the end of the tube 58 and close the orifices 66 and 70. The holder 80, enclosing a plastic mass of the composite confection, is then placed in a refrigerated atmosphere which solidifies the ice cream.

A multiplicity of the holders 80 are placed in succession on the discharge tube and filled in the manner described so that the operation is substantially continuous and the flow of the confection streams through the apparatus need only be interrupted for a period sufficient to place one of the holders over the tube 58.

The solidified composite ice cream confection may be removed from the holders 80 in the form of cakes or blocks by immersing the holders in a warm bath which melts an outer thin layer of the confection, in contact with the metal walls of the holders, permitting the holders to be slid from the ice cream cakes and reused. Desirably the cakes or blocks of confection are placed in a refrigerated atmosphere to resolidify their outer surfaces, after removal from the holders 80, and produce bars of frozen confection.

In some instances the cylindrical cakes, having outer surfaces relatively soft from immersion in the warm bath while retaining a solidified center or core, are rolled in comminuted particles of a suitable food material, such as crushed nuts, which adhere to the soft outer surfaces of the cakes and are firmly bonded thereto upon subsequent solidification of the ice cream in a refrigerated atmosphere.

After solidification the relatively long cakes, formed as described, may be cut up into shorter lengths for packaging, or into individual servings, which may be separately wrapped.

In the event that it is desired to manufacture confections incorporating more than two kinds of material, the apparatus described above may be modified as diagrammatically indicated in Figs. 15 and 16. In these drawings the connecting rod 87 corresponds to the connecting rod 32 and the connecting rods 88 and 89 correspond to connecting rod 31, being adjustably arranged for actuation through different lengths of strokes by means similar to that described above. Piston 84 and cylinder 90 correspond to the piston 30 and cylinder 27 respectively, and the pistons 85 and 86 and cylinders 91 and 92 correspond to the piston 28 and cylinder 26 respectively. Passageways 93, 94, and 95 lead from the cylinders 90, 91, and 92 respectively to discharge or forming tubes 96, 97, and 98 respectively. The tubes 96, 97, and 98 are arranged to carry the separate streams of confection from the cylinders 90, 91, and 92 and passageways 93, 94, and 95 over separate courses, in the same direction and separated from one another, to a common outlet orifice 99. The rate of feed of the confections through the several courses is adjusted so that at the mouth 99 of the discharge unit the linear rate of travel is substantially the same for all of the confections.

When forming confections such as ice cream having figured or ornamental centers, the forming tube 97 is disposed within the outer forming tube 98 and the inner forming tube 96 is disposed within the intermediate forming tube 97. Other arrangements of the forming tubes with respect to one another may be resorted to in accordance with the form of the confection to be produced. For example, in making what is commonly known as neopolitan brick ice cream the outlets or nozzles of the several tubes may be disposed in side by side relation and arranged to extrude a composite cake or block having a plurality of parallel layers.

An advantageous feature of the invention permits the manufacture of cored or fancy center confections in which the size of the core with respect to the surrounding confection can be varied as desired without any substitution or replacement of parts. To increase the size of the core, the rate of feed of the confection or ice cream through the inner or core tube 63 is increased. This is accomplished by lengthening the relative length of the stroke of the piston 28 in the manner described above. On account of the resulting relatively larger amount of confection moving out the orifice 70 with respect to its effective cross-sectional area than out the orifice 66 with respect to its effective cross-sectional area, the confection from the inner orifice 70 swells radially outwardly and occupies a relatively larger portion of the cross-sectional area of the extruded cake or bar, thus increasing the size of the core. In a similar manner, the size of the core can be decreased by shortening the relative length of stroke of the piston which feeds the confection through the inner forming tube 63. In this case, a relatively larger amount of confection moves out the orifice 66, with respect to its effective cross-sectional area, than out the orifice 70, and the core of the confection shrinks inwardly to make room for the increased amount of outer ice cream or confection.

The principles and mode of operation set forth above may be altered or modified without departing from the scope of the invention, change being made in the details relating to the construction of the apparatus and the procedure set forth as desired, there being numerous modifications of both the apparatus and the method contemplated.

What I claim is:

Apparatus for making comestible bars comprising separate compartments for receiving and holding different comestibles, separate pumps for the compartments to withdraw comestible material therefrom and advance the same, each pump including a cylinder and a piston slidable therein, and mechanism for actuating the pistons in synchronism including a pivoted arm and linkages connecting the arm to both pistons, one linkage being adjustable to vary the relative movement of the piston connected thereto with respect to the pivoted arm.

ROBERT R. HUMMEL.